Oct. 5, 1926. 1,601,809
J. W. RIDGWAY
MOTOR VEHICLE FRAME
Filed April 27, 1922 2 Sheets-Sheet 1

Inventor
Joseph W. Ridgway
By his Attorneys
Blackmore, Spencer & Flint.

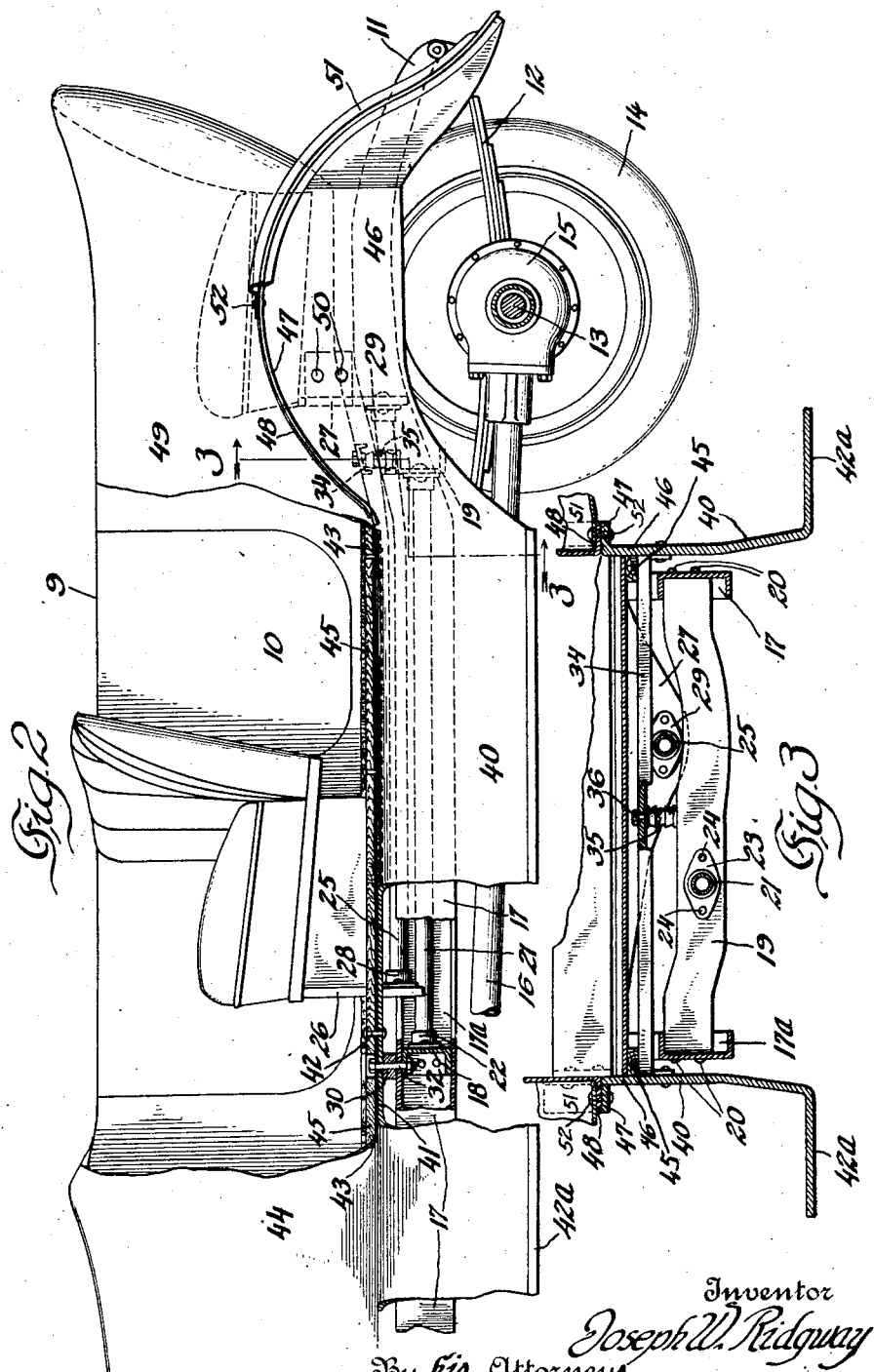

Patented Oct. 5, 1926.

1,601,809

UNITED STATES PATENT OFFICE.

JOSEPH W. RIDGWAY, OF DETROIT, MICHIGAN.

MOTOR-VEHICLE FRAME.

Application filed April 27, 1922. Serial No. 556,890.

This invention relates to body construction for automobiles.

The object of the invention is the provision of a body construction that will eliminate the distortion or twisting of the body due to the torsional stresses and strains to which the same is subjected, incident to the travel of the vehicle over road beds having inequalities therein.

Other and further objects of the invention will appear as the description proceeds.

On the drawing Fig. 1 is a plan view of an automobile with parts broken away;

Fig. 2 is a side elevation thereof with parts in section and parts broken away;

Fig. 3 is a section on line 3—3 of Fig 2.

Figure 1:
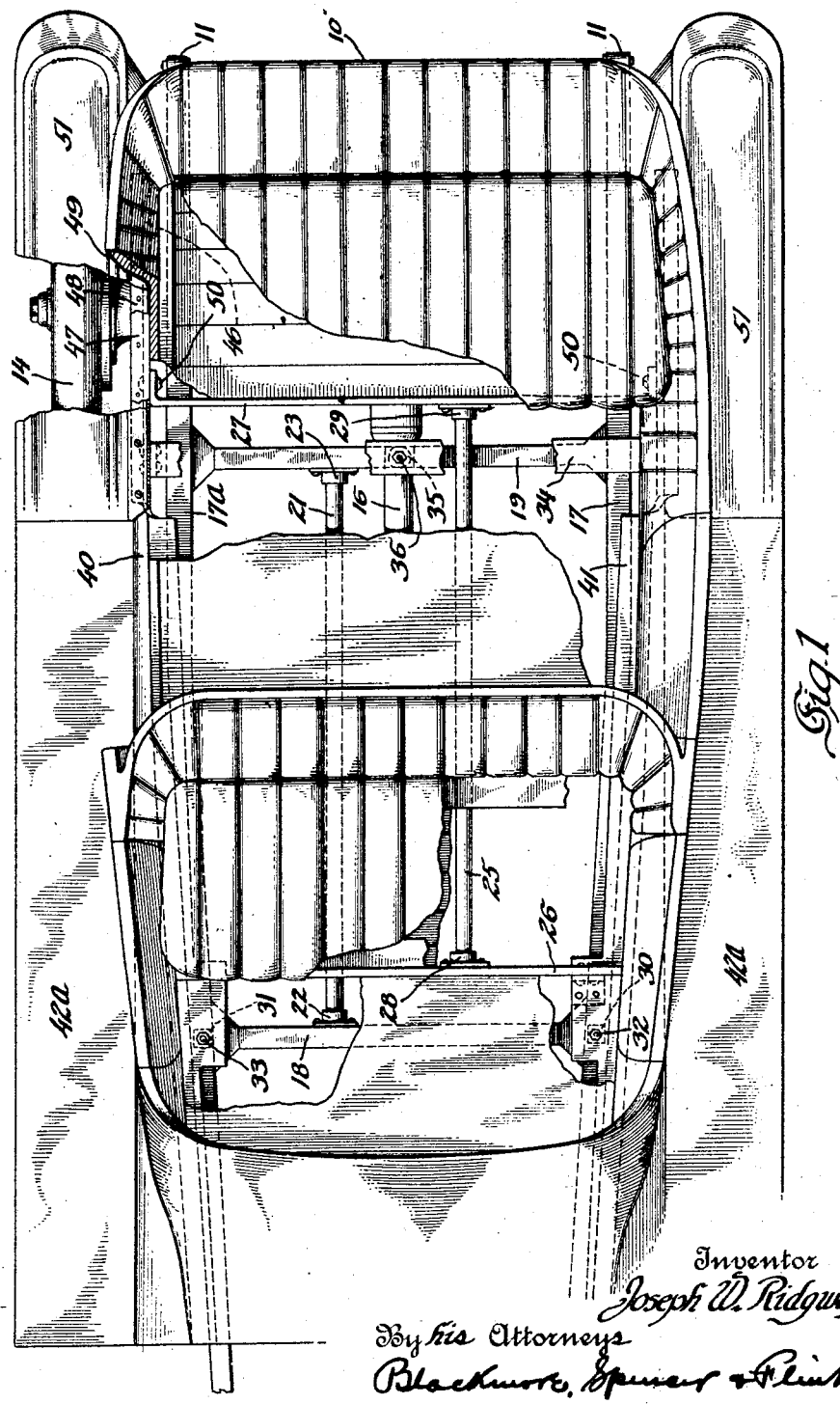

In the operation of automobiles, the body structure is constantly subjected to severe torsional strains due to the distortion of the chassis frame which is caused by the inequalities of the road bed over which the vehicle is traveling. Consequently the joints in the body structure become loosened and the body itself becomes permanently injured as the result of these sudden and repeated torsional strains. This is true of bodies of all types and more especially of closed bodies and bodies wherein the top is made integral with the body portion proper.

On the drawing there is disclosed an arrangement of means whereby the body portion is held rigid and all torsional strains are resisted. Similar means are also disclosed for preventing the torsional strains to which the chassis frame is subjected from being communicated to the body supported thereon but these features form no part of the invention to which this present application relates.

For the purpose of convenience in illustration and simplicity of description the device and the automobile on which it is employed is shown more or less diagrammatically and for the same reasons the body is shown as of the touring type with the top removed.

On the drawing the numeral 9 designates an automobile which is provided with a body 10 and chassis frame 11 which are supported by the springs from the axles in the usual manner. As shown, the rear end of the chassis frame 11 is supported by springs 12 from the axle 13. The axle is supported by the wheels 14 and is provided with the usual differential mechanism 15 and torque tube 16.

The chassis frame consists of the usual longitudinal side bars or members 17 and 17ª which are connected together by a plurality of transverse brace members, two of which, 18 and 19, are shown on the drawing. The brace members 18 and 19 are rigidly secured to the side bars or members by any suitable means such as by the rivets 20.

The chassis frame 11 may be provided with one or more torsional members which are adapted to prevent undue twisting thereof. The torsional member or members may be arranged in any convenient manner and secured to the frame by any suitable means. As shown on the drawing, a single torsional member 21 is employed. This torsional member may be of any suitable form in cross section but preferably it is tubular in order to give the greatest strength for a given amount of material. The front end of the member 21 is rigidly secured to some portion of the frame as the transverse member 18, by any suitable means. As shown, the member 21 has rigidly secured to its front end, a flanged collar 22 which in turn is attached or connected to the transverse member 18 in any suitable manner as by means of bolts or rivets extending through perforations in the flange of said collar. The rear end of the member 21 is likewise secured to some portion of the frame. as the transverse member 19 in any suitable manner. As shown, a flanged collar 23 rigidly secured to the rear end of the torsion member 21 has its flange connected to the transverse member 19 by any suitable means, such as the bolts or rivets 24.

Means are provided for so bracing the body itself as to prevent torsional strains from distorting the same. This means may be employed in connection with, or independently of, a torsional member on the chassis frame. This device may be of any suitable construction and arranged in any convenient manner. As shown on the drawing, a torsional member 25 is arranged between and secured to any suitable abutment members carried by the body 10. The heelboards 26 and 27 of the front and rear seats may be extended beneath the floor of said body to form these abutments as shown in Fig. 2 of the drawings. The torsional member 25 is provided at its front end with a flanged collar 28 which is secured to the heel board 26 by any suitable means such as bolts or rivets extending through apertures in said flanges. The rear end of the torsional member 25 is bent upwardly so that it will extend above the cross member 19 and also follow the contour of the rear portion of the body. The member 19 has its intermediate portion offset downwardly so that the member 25 will not interfere therewith. The rear end of the member 25 is also provided with a flanged collar 29 which is rigidly secured to the heel-board 27 in any suitable manner as by bolts or rivets. The heel-boards 26 and 27 may be strengthened or braced in any suitable manner if found necessary. The torsional member 25 may be of any suitable shape or construction; that shown on the drawing is tubular in cross section for the purpose of giving it greater strength for the amount of material employed. It is understod that a plurality of these torsional members may be employed if necessary to prevent distortion of the body.

The body is mounted in any suitable manner on the chassis frame. Preferably, however, the body is mounted by means of a three point suspension in order that the chassis frame may have a limited torsional movement without affecting the body carried thereby. The three points for the suspension may be arranged in any desirable manner. In the arrangement shown, two points are in front and one in the rear although it is understood the arrangement may be otherwise. As shown, the front portion of the body is supported on a resilient member arranged at each side thereof and the rear is supported on a single resilient member arranged on the longitudinal axis of said body. Any suitable resilient means may be employed for this purpose. In the form illustrated, rubber blocks 30 and 31 are interposed between the floor sills at the forward end of the body and the upper flanges on the longitudinal side bars 17 and 17ª. Bolts 32 and 33 extend down through the floor of the car, the rubber blocks, the over-lapping flanges of the side bars and transverse member 18. The body is provided adjacent its rear end with any suitable support such as a transverse member 34. A suitable spherical rubber block 35 is interposed between the central portion of the transverse member 34 and the transverse member 19. A bolt 36 holds the parts in assembled relation. The parts are so constructed and arranged that the frame may have a slight twisting movement beneath the body.

It will thus be seen that the front end of the body is supported by a resilient member at each side thereof and that these resilient members being located adjacent the transverse center line of the frame where the torsional movement of said frame is at its minimum, the torsional force transmitted to the rubber blocks and absorbed by them is very slight. Moreover a single point suspension at the rear will permit the frame to twist beneath the body without affecting the same.

In order to further strengthen the body and to simplify and cheapen the construction thereof the usual sub-frame or heavy body or side sills to which the body is usually secured, may be dispensed with and a combined splash guard and running board be made of heavy stock and so arranged that the body may be attached thereto. As shown, the running board apron or splash guard 40 is provided with an inwardly extending flange 41 which, with the guard, constitutes a metallic side or body sill for said body. The flange 41 is adapted to be rigidly secured to the under portion of the body by any suitable means such as the bolts or rivets 42 which extend upwardly through said flange, through the inturned edges 43 of the metallic sides 44 and through the light wooden sills 45, to which the floor is attached, for rigidly securing the parts together. The lower end of the guard 40 is bent outwardly to form the step or running board 42ª. The rear end of the guard 40 is provided with an extension 46 that extends upwardly and rearwardly substantially in the plane of the side of the body with which it engages, to form the inner portion of the wheel house. The rear portion of the body is supported from the extensions 46 in any suitable manner. As shown, the ends of the frame member or heel board 27 at the rear portion of the body are secured to the extensions by means of the bolts or rivets 50. The upper arcuate edge of each extension 46 may be provided with an outwardly extending flange 47 to which is secured the outwardly extending flange 48 of the lower edge of the rear side panel 49 of the body. The fenders 51 may be secured to the ledges formed by the flanges 47 and 48 by any suitable means such as the bolts or rivets 52 which secure the said flanges together.

While the torsional member may be employed on the body without employing one on the frame and vice versa, yet it is believed that the best results are obtained by employing them together in the same construction, because it is then possible to employ a lighter torsional tube on the frame to thereby permit a slight flexibility of the frame. It is highly desirable to permit a certain amount of flexibility of the frame in order to prevent racking of the same due to the torsional strains and stresses to which it is continuously being subjected as a result of the inequalities in the road bed over which the vehicle travels.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

What I claim is:—

1. In a vehicle, a chassis frame and a body mounted thereon, said body being provided with transverse members; and a torsional tube member extending longitudinally of said body and rigidly secured to said transverse members for preventing torsional distortion of said body, substantially as shown and described.

2. In a vehicle, a chassis frame, a body, a three-point resilient suspension means for mounting said body on said frame, said means including a resilient support at each side of said body and engaging an intermediate portion of said frame and a single resilient support for supporting the rear portion of said body from said frame, and a torsional member associated with and extending longitudinally of, and the ends of which are secured to transversely extending members of said body for preventing distortion of said body during the travel of said vehicle.

3. In a vehicle, a chassis frame, a body, a three point suspension for mounting said body on said frame, and a tubular torsional member carried by and extending longitudinally of said body, and the ends of which are rigidly fastened to said body at points spaced apart from one another, to thereby prevent distortion of said body, substantially as shown and described.

4. In a vehicle body, a combined splash guard and running board extending longitudinally of the body and having an inwardly extending flange 41 at its upper edge; said upper edge being fastened to the under side of the body so that the splash guard and running board form in effect a side sill for the body.

5. In a vehicle body, a combined splash guard and running board extending longitudinally of the body and having an inwardly extending flange 41 at its upper edge, said upper edge being fastened to the under side of the body at the forward part thereof so that the splash guard and running board form in effect a side sill for the body; said splash guard and running board having a rearwardly extending portion integral therewith and extending to, and which portion is adapted to support the rear end of the vehicle body, said rear end being secured to the rearward extension of said splash guard and running board.

6. In a vehicle, a body, a combined splash guard and running board member secured to said body and forming a side sill for the same, a rearward extension on said member for supporting the rear portion of said body and for forming a side of the wheel house, seats in said body provided with heel-boards, said heel-boards extending beneath the floor of said body, and a torsional member having its ends rigidly secured to said heel-board extensions, for preventing distortion of said body.

In testimony whereof I affix my signature.

JOSEPH W. RIDGWAY.